United States Patent
Wang et al.

(10) Patent No.: US 12,007,259 B2
(45) Date of Patent: Jun. 11, 2024

(54) MULTI-DIMENSIONAL SPATIAL POSITIONING SYSTEM AND METHOD FOR DISTURBANCE SOURCE

(71) Applicant: Shanghai Institute of Optics and Fine Mechanics, Chinese Academy of Sciences, Shanghai (CN)

(72) Inventors: Zhaoyong Wang, Shanghai (CN); Jiajing Liang, Shanghai (CN); Boqi Chen, Shanghai (CN); Haiwen Cai, Shanghai (CN); Qing Ye, Shanghai (CN)

(73) Assignee: SHANGHAI INSTITUTE OF OPTICS AND FINE MECHANICS, CHINESE ACADEMY OF SCIENCES, Shanghai (CN)

( * ) Notice: Subject to any disclaimer, the term of this patent is extended or adjusted under 35 U.S.C. 154(b) by 403 days.

(21) Appl. No.: 17/420,578

(22) PCT Filed: Dec. 30, 2019

(86) PCT No.: PCT/CN2019/129929
§ 371 (c)(1),
(2) Date: Jul. 2, 2021

(87) PCT Pub. No.: WO2020/140869
PCT Pub. Date: Jul. 9, 2020

(65) Prior Publication Data
US 2022/0107209 A1 Apr. 7, 2022

(30) Foreign Application Priority Data
Jan. 3, 2019 (CN) .......................... 201910005067.7

(51) Int. Cl.
*G01D 5/353* (2006.01)
*G01H 9/00* (2006.01)

(52) U.S. Cl.
CPC ..... *G01D 5/35325* (2013.01); *G01D 5/35364* (2013.01)

(58) Field of Classification Search
CPC ............... G01D 5/353; G01D 5/35325; G01D 5/35364; G01H 9/00
See application file for complete search history.

(56) References Cited

U.S. PATENT DOCUMENTS 9,002,149 B2 * 4/2015 Rogers ............... G01M 11/3181
385/11
11,846,541 B2 * 12/2023 Kojima .................. G08B 13/02
(Continued)

FOREIGN PATENT DOCUMENTS

CN 102628698 A 8/2012
CN 102997945 A 3/2013
(Continued)

OTHER PUBLICATIONS

Int'l Search Report dated Mar. 27, 2020 in Int'l Application No. PCT/CN2019/129929.
(Continued)

*Primary Examiner* — Nguyen Q. Ha
(74) *Attorney, Agent, or Firm* — Panitch Schwarze Belisario & Nadel LLP

(57) ABSTRACT

A multi-dimensional spatial positioning system and method for disturbance source. The system includes a distributed-optical fiber sensor, a sensing optical fiber, a coordinate system, a disturbance source to be monitored, a first signal group, and a second signal group. The disturbance source is positioned by combining an array signal processing method with the distributed optical fiber sensor, using different laying manners for the sensing optical fiber and a certain number of flexibly selected sensing units distributed a certain distance from each other along a line, and combining with a special signal processing method, thereby realizing a
(Continued)

function of being capable of monitoring multi-dimensional spatial position information of the disturbance source in real time in both short and long distances.

15 Claims, 5 Drawing Sheets

(56) References Cited

U.S. PATENT DOCUMENTS

| | | | |
|---|---|---|---|
| 2016/0216136 A1 | 7/2016 | Luvalle | |
| 2017/0082484 A1* | 3/2017 | Farhadiroushan | G01V 1/226 |
| 2018/0031414 A1* | 2/2018 | Farhadiroushan | G01H 9/004 |
| 2020/0240834 A1* | 7/2020 | Hveding | G01H 9/004 |
| 2021/0190550 A1* | 6/2021 | Handerek | G01K 11/32 |

FOREIGN PATENT DOCUMENTS

| | | | | |
|---|---|---|---|---|
| CN | 103196465 A | * | 7/2013 | G01D 3/028 |
| CN | 103411660 A | | 11/2013 | |
| CN | 103954311 A | | 7/2014 | |
| CN | 105389917 A | | 3/2016 | |
| CN | 105466548 A | | 4/2016 | |
| CN | 107167168 A | | 9/2017 | |
| WO | 2017105426 A1 | | 6/2017 | |

OTHER PUBLICATIONS

Bergman et al, "Phase-based, high spatial resolution and distributed, static and dynamic strain sensing using Brillouin dynamic gratings in optical fibers," Optics Express, vol. 25, No. 5, pp. 5376-5388 (Mar. 6, 2017).

Chen et al, "Phase-detection distributed fiber-optic vibration sensor without fading-noise based on time-gated digital OFDR," Optics Express, vol. 25, No. 7 (Apr. 3, 2017).

Dmochowski et al, "Broadband music: Opportunities and challenges for multiple source localization. IEEE Workshop on Applications of Signal Processing to Audio & Acoustics," IEEE Workshop on Applications of Signal Processing to Audio and Acoustics, pp. 18-21 (Oct. 21-24, 2007).

Pan et al, "Phase-sensitive OTDR system based on digital coherent detection," Asia Communications & Photonics Conference & Exhibition, IEEE, vol. 8311, pp. 83110S-1-83110S-6 (2012).

Wang et al, "Novel distributed passive vehicle tracking technology using phase sensitive optical time domain reflectometer," Chinese Optics Letters, vol. 13, No. 10, pp. 100603-1-100603-5 (Oct. 10, 2015).

Tenqing, "Study of Long Oil-Full Gas Line Sensory Detection Techniques Based on Brillouin Optical Time Domain Analysis", Full Databse Engineering Technology I, Article of Superior Shina, pp. 1, 23 and 15 (Aug. 2014).

Office Action dated Apr. 29, 2022 in CN Application No. 201910005067.7 with English translation.

\* cited by examiner

MULTI-DIMENSIONAL SPATIAL POSITIONING SYSTEM AND METHOD FOR DISTURBANCE SOURCE

CROSS-REFERENCE TO RELATED APPLICATIONS

This application is a Section 371 of International Application No. PCT/CN2019/129929, filed Dec. 30, 2019, which was published in the Chinese language on Jul. 9, 2020 under International Publication No. WO 2020/140869 A1, which claims priority under 35 U.S.C. § 119 to Chinese Patent Application No. 201910005067.7, filed on Jan. 3, 2019, the disclosures of all of which are incorporated herein by reference.

TECHNICAL FIELD

The invention relates to the field of disturbance source monitoring, in particular to a multi-dimensional spatial positioning system and method for disturbance source based on a distributed optical fiber acoustic sensor.

BACKGROUND

Distributed optical fiber acoustic sensors are widely used in railway safety, oil and gas pipeline monitoring, perimeter security and other fields. Existing distributed acoustic sensors only have one-dimensional detection capability, and abnormal signals can only be positioned within one-dimensional axial space along the sensing fiber, while two-dimensional or three-dimensional spatial position information of the disturbance sources cannot be accurately obtained for the abnormal sound signals generated far away from the sensing optical fiber.

A prior art 1 [Wang Z, Pan Z, Ye Q, et al. Novel distributed passive vehicle tracking technology using phase sensitive optical time domain reflectometer. Chinese Optics Letters, 2015, 13(10).] can continuously and quantitatively monitor the sound field generated by vehicles driving along the optical fiber by constructing a set of phase sensitive optical time domain reflectometer, but the positioning range of the disturbance source signal is limited in the one-dimensional axial space of the sensing optical fiber.

A prior art 2 [Chen D, Liu Q, He Z. Phase-detection distributed fiber-optic vibration sensor without fading-noise based on time-gated digital OFDR. Optics Express, 2017, 25(7):8315.] can quantitatively monitor the sound field signal along the sensing optical fiber by constructing an optical frequency domain reflectometer without fading-noise, which achieves the sensing bandwidth in the order of kilohertz and the sensing distance in the order of kilometers.

A prior art 3 [Pan Z, Cai H, Qu R, et al. Phase-sensitive OTDR system based on digital coherent detection. Asia Communications & Photonics Conference & Exhibition. IEEE, 2012.] proposes a phase-sensitive optical time domain reflectometer quantitative measurement system based on digital coherent demodulation and a demodulation formula for amplitude and phase information, but the quantitative sound field measurement capability has not been further applied to the three-dimensional positioning of the disturbance source.

A prior art 4 [Bergman A, Langer T, Tur M. Phase-based, high spatial resolution and distributed, static and dynamic strain sensing using Brillouin dynamic grating in optical fibers. Optics Express, 2017, 25 (5): 5376.] uses image processing technology to perform effective noise reduction processing on the distributed optical fiber sensors based on the Brillouin scattering principle, which can achieve stress measurement with high signal-to-noise ratio in a long-distance range, but the optimization of signal quality is essentially the optimization of single-point measurement performance, and it still does not have the ability of the two-dimensional or even three-dimensional positioning.

A Prior art 5 [Dmochowski J P, Benesty J, Affes, Sofiène. Broadband music: Opportunities and challenges for multiple source localization. IEEE Workshop on Applications of Signal Processing to Audio & Acoustics. IEEE, 2007.] uses point-type microphones to form a sensor array, and uses an direction-of-arrival estimation algorithm to achieve a small range of the sound source three-dimensional positioning, but the method is difficult to achieve continuous positioning capabilities within a range of 100 meters or even kilometers, and the microphone spacing cannot be flexibly adjusted according to signal characteristics.

SUMMARY OF THE INVENTION

In order to overcome the disadvantages of the prior art described above, the invention provides a multi-dimensional spatial positioning system and method for disturbance source based on a distributed optical fiber acoustic sensor, which realizes the function of real-time monitoring multi-dimensional spatial position information of the disturbance sources in long and short distances, and has the advantages of simple implementation, low cost, large range and high precision. In the invention, not only the abnormal signal detection accuracy of the distributed optical fiber acoustic sensors in the fields of railway safety, oil and gas pipeline monitoring, perimeter security etc. can be greatly improved, but also the range of the applications of traditional distributed optical fiber acoustic sensors are broadened, such as positioning monitoring of unmanned aerial vehicles and so on, which has revolutionary significance in the field of distributed optical fiber sensing.

In order to achieve the above purposes, the invention adopts the following technical solution:

One aspect of the present invention provides a multi-dimensional spatial positioning system for disturbance source, the multi-dimensional spatial positioning system at least comprises a distributed optical fiber acoustic sensor, a sensing optical fiber, a disturbance source to be monitored and a coordinate system, wherein the distributed optical fiber acoustic sensor is coupled to the sensing optical fiber, the distributed optical fiber acoustic sensor emits detection light pulses to the sensing optical fiber, so that sound field distribution signals are obtained, sound field distribution signals and a laying mode of the sensing optical fiber are processed, a key parameter of the disturbance source to be monitored relative to the sensing optical fiber is obtained and spatial position coordinates of the disturbance source are calculated;

wherein the key parameter at least comprises one or more of a azimuth angle, a pitch angle, a transverse distance, a radial distance, a sound speed and a frequency;

the laying mode of the sensing optical fiber comprises one or more of a two-dimensional space laying mode and a three-dimensional space laying mode.

the disturbance source at least comprises an object that generates sound waves, seismic waves and water waves through vibration.

Preferably, the distributed optical fiber acoustic sensor comprises one or more of a phase-sensitive optical time domain reflectometer with coherent detection, a phase-sensitive optical time domain reflectometer with direct detection, an optical frequency domain reflectometer, a distributed optical fiber sensor based on Brillouin scattering principle.

Preferably, the distributed optical fiber acoustic sensor comprises a high spatial resolution, high response bandwidth, high sensitivity and other performance optimization and upgrading system based on a phase-sensitive optical time domain reflectometer with coherent detection, a phase-sensitive optical time domain reflectometer with direct detection, an optical frequency domain reflectometer, or a distributed optical fiber sensor based on Brillouin scattering principle.

Preferably, the two-dimensional spatial laying mode comprises one of a dual-parallel optical fiber laying structure and an S-like bent optical fiber laying structure.

Preferably, the dual-parallel optical fiber laying structure is a special-shaped sensitization dual-parallel optical fiber laying structure with mandrel or a special-shaped sensitization dual-parallel optical fiber laying structure without mandrel.

Preferably, the three-dimensional space laying mode is a double-layer dual-parallel optical fiber laying structure.

Preferably, the double-layer dual-parallel optical fiber laying structure is a special-shaped sensitization double-layer dual-parallel optical fiber laying structure with mandrel or a special-shaped sensitization double-layer dual-parallel optical fiber laying structure without mandrel.

The two-dimensional space laying mode and the three-dimensional space laying mode are helpful for further processing the sound field distribution signals, the laying modes are required to be specially set according to the application scene, and each bend of the sensing optic fibers required to be within the allowable loss range.

The invention utilizes the distributed optical fiber sensor and the multi-dimensional laying mode of the sensing optical fiber, and acquires real-time sound field distribution signals through flexibly selected sensing units distributed along the sensing optical fiber line, and after processing, the key parameters of the disturbance sources to be monitored relative to the sensing optical fiber can be obtained.

Another aspect of the invention provides a multi-dimensional spatial positioning method for disturbance sources, which can be used for three-dimensional positioning of a single disturbance source or multiple disturbance sources, and there are m disturbance sources to be monitored, and m is greater than 1, and the method is characterized in that the method comprises the following three steps:

step 1) setting up a coordinate system (x, y, z) in a three-dimensional space, laying a sensing optical fiber in a laying mode recorded as T[x, y, z], emitting detection light pulses to the sensing optical fiber via the distributed optical fiber acoustic sensor, and quantitatively detecting a sound field along the sensing optical fiber to obtain sound field signals S(l, t) distributing along the optical fiber, wherein t represents time, l represents one-dimensional axial spatial coordinates of the sensing fiber;

step 2) pre-processing the obtained sound field signals S(l, t) distributing along the optical fiber:

firstly, performing a coordinate system transformation of the sound field signals S(l, t) distributing along the optical fiber, thereby obtaining a distribution $S_d(x, y, z, t)=T[S(z, t)]$ of the sound field distribution signals within a space formed by the sensing optical fiber, secondly, determining a center frequency $f_0$ of the disturbance source to be monitored, setting an sound field intensity threshold E by a data processing unit according to each disturbance source to be monitored, and searching for an area to be detected $\Omega(x, y, z)$ where the sound field intensity is greater than the threshold E in a sound field distribution signal $S_d(l, t)$, and selecting an sound field time-domain signal matrix formed by n adjacent sound field sampling signals as a first signal group within the area to be monitored $\Omega(x, y, z)$, wherein a direct distance between the sound field sampling signals is as close as possible to $$d = \frac{v}{2f_0}$$

(wherein $v$ is the propagation rate of sound waves in the medium), wherein the first signal group is expressed as follows:

$$X_1(x,y,z,t)=[S_d(x_1,y_1,z_1,t)S_d(x_2,y_2,z_2,t) \ldots S_d(x_n,y_n,z_n,t)]^T.$$

Wherein a sum of transverse dimensions of spaces occupied by the adjacent n sound field sampling signals of the first signal group is L, wherein n is greater than m, that is, when there are multiple disturbance sources, it is necessary to ensure that a number of sound field sampling signals of each signal group is more than a number of disturbance sources, so as to avoid signal interference between different disturbance sources and improve monitoring accuracy;

step 3) applying an array signal processing method to the signal group in the step 2) to calculate the spatial position coordinates of the disturbance source to be monitored.

Preferably, a selection of the signal group in step 2) further comprises selecting other signal groups, and comprises the following steps:

selecting a second signal group, selecting signals in an area with a spatial distance ($L^1$) greater than L from the first signal group as the second signal group within the area to be detected $\Omega(x, y, z)$, wherein the second signal group contains n sound field sampling signals between which a spacing is as close as possible to $$d = \frac{v}{2f_0},$$

wherein the second signal group is expressed as follows:

$$X_2(x,y,z,t)=[S_d(x_1^2,y_1^2,z_1^2,t)S_d(x_2^2,y_2^2,z_2^2,t) \ldots S_d(x_n^2,y_n^2,z_n^2,t)]^T$$

selecting an e-th signal group, selecting signals in an area with spatial distances ($L^1, L^2, \ldots L^{e-1}$) greater than L from the first to the (e−1)-th signal groups as the e-th signal group within the area to be detected $\Omega(x, y, z)$, wherein the e-th signal group contains n sound field sampling signals between which a spacing is as close as possible to $$d = \frac{v}{2f_0},$$

wherein the e-th signal group is expressed as follows:

$$X_e(x,y,z,t)=[S_d(x_1^e,y_1^e,z_1^e,t)S_d(x_2^e,y_2^e,z_2^e,t) \ldots S_d(x_n^e,y_n^e,z_n^e,t)]^T$$

The selection of the quantity of signal groups is determined according to the distance range of the disturbance sources to be monitored and the subsequent signal processing method, or there can be only a single signal group. When the data range of disturbance sources to be monitored is larger and the distance is longer, increasing the quantity of signal groups reasonably is helpful to improve the accuracy of 3D positioning of disturbance sources to be monitored.

Preferably, the array signal processing method in step 3) comprises one of a beam forming algorithm, a spatial spectrum estimation algorithm, and a direction-of-arrival estimation algorithm.

Preferably, the spatial spectrum calculation method in step 3) is as follows:

firstly, calculating a covariance matrix of the first signal group, $$R_\eta = \frac{\sum_{i=1}^{N} X_1(x, y, z, t_i) X_1(x, y, z, t_i)^T}{N}$$

wherein N represents repetition number of detection light pulses emitting from the distributed optical fiber acoustic sensor to the sensing optical fiber through the optical port;

secondly, performing eigenvalue decomposition on the covariance matrix R to obtain noise subspaces $E_n$, calculating signal subspaces $E_s(\theta_i, r_i)$ corresponding to the signal groups according to the sensing fiber laying mode T[x, y, z], wherein $\theta_i$ represents the azimuth angle of the i-th disturbance source, $r_i$ represents the linear distance from the i-th disturbance source to an center position of the signal groups, and the loss function is calculated according to the following equation, $$\Gamma(\theta_i, r_i) = \frac{1}{(E_s(\theta_i, r_i)E_n)^H} E_n E_s(\theta_i, r_i)$$

wherein, H represents the conjugate transpose, and the azimuth vector $(\theta_i, r_i)$ of the disturbance source relative to the first signal group is calculated by searching for the maximum value of the loss function;

finally, the two-dimensional space coordinates of the i-th disturbance source is calculated according to the following equation, $$(x_i = r_i \sin \theta_i, y_i = r_i \cos \theta_i)$$

when the range of the disturbance source to be monitored is larger and the distance is longer, the e is selected to 2, preferably the array signal processing method in step 3) adopts a beam forming algorithm, and the steps are as follows:

firstly, respectively calculating covariance matrices of the first signal group and the second signal group according to the following equation, $$R_1 = \frac{\sum_{i=1}^{N} X_1(x, y, z, t_i) X_1(x, y, z, t_i)^T}{N}$$

$$R_2 = \frac{\sum_{i=1}^{N} X_2(x, y, z, t_i) X_2(x, y, z, t_i)^T}{N}$$

wherein N represents repetition number of detection light pulses transmitting from the distributed optical fiber acoustic sensor to the sensing optical fiber;

secondly, respectively calculating phase delay vector $A^1(\theta_i^1, \varphi_i^1)$ corresponding to the first signal group and phase delay vector $A^2(\theta_i^2, \varphi_i^2)$ corresponding to the second signal group according to a sensing fiber laying method T[x, y, z], wherein $\theta_i^1$ represents an azimuth angle between an i-th disturbance source and the first signal group and $\theta_i^2$ represents an azimuth angle between the i-th disturbance source and the second signal group, $\varphi_i^1$ represents a pitch angle between the first signal group and the i-th signal group, $\varphi_i^2$ represents a pitch angle between the second signal group and the i-th signal group, and the spatial energy distribution functions $D(\theta, \varphi)$ of the disturbance source is calculated according to the following equation, $$D(\theta_1^1, \varphi_1^1) = A^1(\theta_1^1, \varphi_1^1)^H R_1 A^1(\theta_1^1, \varphi_1^1)$$

$$D(\theta_1^2, \varphi_1^2) = A^1(\theta_1^2, \varphi_1^2)^H R_2 A^1(\theta_1^2, \varphi_1^2)$$

wherein, H represents the conjugate transpose, the azimuth vector $(\theta_1^1, \varphi_1^1)$ of the i-th disturbance source relative to the first signal group and the azimuth vector $(\theta_1^1, \varphi_1^1)$ of the i-th disturbance source relative to the second signal group is calculated by searching maximum values on the spatial energy distribution functions $D(\theta, \varphi)$, finally, the three-dimensional space coordinates of the i-th disturbance source are obtained by calculating the direction vector corresponding to the first signal group and the second signal group according to the following equation, $$\left(x_i = y_i \tan \theta_i^1,\ y_i = \frac{L^1}{|\tan \theta_i^1 - \tan \theta_i^2|},\ z_i = \frac{y}{\cos \theta_i^1 \tan \varphi_i^1}\right)$$

wherein $L^1$ is the spatial distance corresponding to the first signal group and the second signal group.

The advantages and technical effects of the invention are as follows:

1) the invention can be implemented simply, the two-dimensional space laying mode and the three-dimensional space laying mode of the sensing optical fiber make the arrangement of the sensing unit more three-dimensional, and the obtained signals more accurate and rich; the sensing optical fiber of the invention belongs to passive distributed sensing, and the laying modes are simple and easy to realize, and has the advantages of low cost, high reliability and high precision.

2) the invention acquires a plurality of sound field sampling signals and a plurality of signal groups through a large number of the sensing units which can be flexibly selected in real time on the sensing optical fiber, the selection of the plurality of the sound field sampling signals is helpful to realize an accuracy of the three-dimensional spatial position when there are a plurality of disturbance sources at the same time, and the selection of the plurality of signal groups is helpful to improve the monitoring range and distance of the disturbance sources. Therefore, the invention has the advantages of large range of monitoring, long distance, high precision, real-time monitoring and the like. In the invention, not only the abnormal signal detection accuracy of the distributed optical fiber acoustic sensors in the fields of railway safety, oil and gas pipeline monitoring, and perimeter security, etc. can be greatly improved, but also the application of traditional distributed optical fiber acoustic sensors in the new fields, such as positioning monitoring of unmanned aerial vehicles and so on, can be realized, which has revolutionary significance.

DETAILED DESCRIPTION

In order to facilitate an understanding of the embodiments of the present invention, a further explanation of several specific embodiments will be given below in conjunction with the accompanying drawings, and each embodiment is not intended to constitute a limitation of the embodiments of the present invention. In addition, the drawings are schematic diagrams, so the device and apparatus of the present invention are not limited by the size or scale of the schematic diagrams.

It should be noted that in the claims and specification of the patent, related terms such as first and second, etc. are only configured to distinguish one entity or operation from another entity or operation, and do not necessarily require or imply any such actual relationship or order between these entities or operations. Furthermore, the terms "comprise" or "comprising" or "include" or any other variations thereof are intended to encompass a non-exclusive inclusion, such that a process, method, article, or apparatus comprising a plurality of elements includes not only those elements, but also other elements which are not definitely listed, or elements inherent to the process, method, article, or apparatus. Without more limitations, the element defined by the phrase "comprising one" does not exclude additional same elements existing in the process, method, article, or equipment comprising the element.

Figure 1:
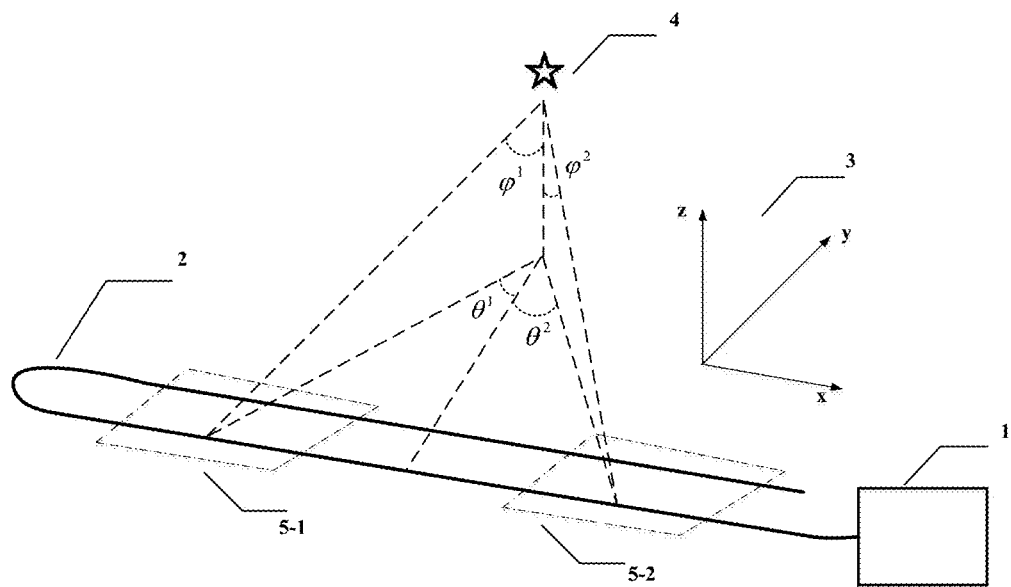
FIG. 1 is a schematic diagram of a three-dimensional spatial positioning system for a single disturbance source.
Figure 2:
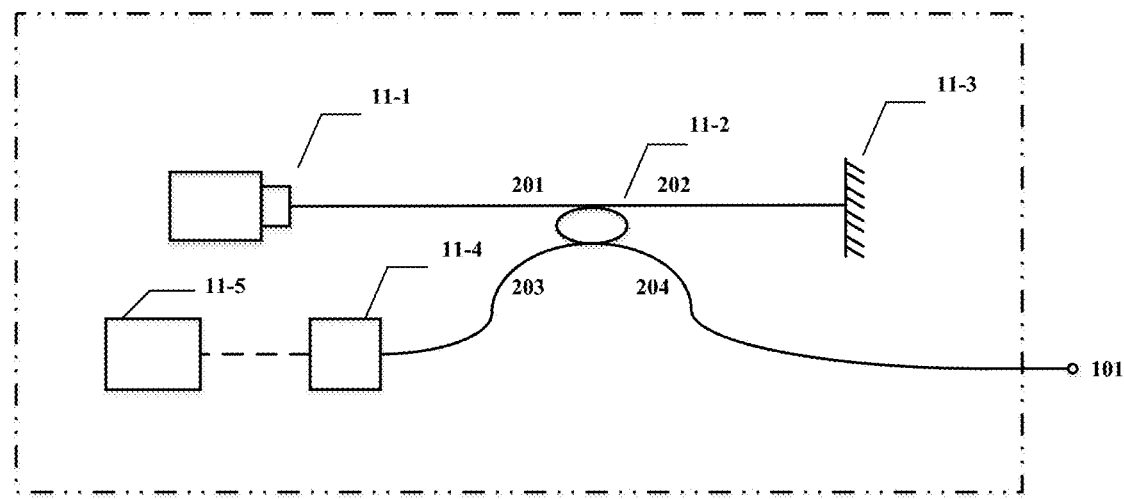
FIG. 2 is a schematic structural diagram of a distributed optical fiber acoustic sensing system based on an optical frequency domain reflectometer with a Michelson interferometer structure.
Figure 8:
FIG. 8 is a dual-parallel fiber laying structure.

Embodiment 1: Three-Dimensional Spatial Positioning for a Single Disturbance Source The embodiment 1 proposes a three-dimensional spatial positioning system for the single disturbance source, wherein the sensing optical fiber is laid in a dual-parallel structure, and the schematic diagram of its principle is shown in FIG. 1. The system comprises a distributed optical fiber acoustic sensing system 1 comprising an optical frequency domain reflectometer with a Michelson interferometer structure, a sensing optical fiber 2 with a dual-parallel structure laying mode (as shown in FIG. 8), a coordinate system 3, a disturbance source to be monitored 4, a first signal group 5-1, a second signal group 5-2, wherein the optical frequency domain reflectometer 1 is connected with the sensing optical fiber 2, and the spatial heights of the disturbance source to be monitored and the sensing optical fiber are different. The structure of the distributed optical fiber acoustic sensing system 1 based on the optical frequency domain reflectometer with the Michelson interferometer structure is shown in FIG. 2, which comprises a frequency tunable laser 11-1, an optical fiber coupler 11-2, an optical fiber reflection end face 11-3, a photoelectric detector 11-4, and a data processing unit 11-5.

The frequency tunable laser 11-1 outputs a linear frequency modulating laser, which is respectively output to a second port 202 and a fourth port 204 of the optical fiber coupler 11-2 through a first port 201 of the optical fiber coupler 11-2. The second port 202 of the optical fiber coupler 11-2 is coupled to the optical fiber reflection end face 11-3. The fourth port 204 of the optical fiber coupler 11-2 is coupled to the optical port 101. A third port 203 of the optical fiber coupler 11-2 is coupled to the photoelectric detector 11-4, and a signal output by the photoelectric detector is coupled to the data processing unit 11-5.

Three-dimensional spatial positioning method for the single disturbance source mainly comprises three steps:

step 1) emitting detection light pulses to the sensing optical fiber 2 via the optical frequency domain reflectometer 1, quantitatively detecting the sound field sensed along the sensing optical fiber, and obtaining sound field signals S(l, t) distributed along the optical fiber.

step 2) pre-processing the obtained sound field signals by the optical frequency domain reflectometer 1.

firstly, a coordinate system transformation of the sound field signals S(l, t) is performed according to the laying mode T[x, y, z] of the sensing fiber to obtain a distribution $S_d(x, y, z, t)=T[S(l, t)]$ of the sound field distribution signals within the space formed by the sensing optical fiber. The data processing unit is required to set the sound field intensity threshold E according to the disturbance source to be monitored in advance, and search for the area to be monitored $\Omega(x, y, z)$ where the sound field intensity is greater than the threshold E within the sound field signal distribution $S_d(l, t)$.

secondly, the data processing unit is required to determine the center frequency $f_0$ of the disturbance source to be monitored in advance, and the data processing unit selects a sound field time-domain signal matrix composed of n adjacent sound field sampling signals with a space as close as possible to $d=v/2f_0$ within the area to be monitored $\Omega(x, y, z)$ as a first signal group, $$X_1(x,y,z,t)=[S_d(x_1,y_1,z_1,t)S_d(x_2,y_2,z_2,t) \ldots S_d(x_n,y_n,z_n,t)]^T$$

then, trying to select a sound field time-domain signal matrix composed of n adjacent sound field sampling signals away from the first signal group with a space as close as possible to $d=v/2f_0$ as a second signal group within the area to be detected, $$X_2(x,y,z,t)=[S_d(x_1^2,y_1^2,z_1^2,t)S_d(x_2^2,y_2^2,z_2^2,t) \ldots S_d(x_n^2,y_n^2,z_n^2,t)]^T$$

step 3) processing the signal groups according to a beam forming algorithm, and calculating covariance matrixes of the first signal group and the second signal group according to the following equation, $$R_1 = \frac{\sum_{i=1}^N X_1(x, y, z, t_i) X_1(x, y, z, t_i)^T}{N}$$

$$R_2 = \frac{\sum_{i=1}^N X_2(x, y, z, t_i) X_2(x, y, z, t_i)^T}{N}$$

wherein N represents repetition number of the detection light pulses emitted from the distributed optical fiber acoustic sensor 1 (the optical frequency domain reflectometer) to the sensing optical fiber 2;

secondly, respectively calculating phase delay vectors $A^1(\theta_1^1, \varphi_1^1)$ corresponding to the first signal group and phase delay vectors $A^2(\theta_1^2, \varphi_1^2)$ corresponding to the second signal group according to laying mode T[x, y, z] of the sensing fiber, wherein $\theta_1^1$, $\theta_1^2$ respectively represent the azimuth angle between the disturbance source and the first signal group and the azimuth angle between the disturbance source and the second signal group, and $\varphi_1^1$, $\varphi_1^2$ respectively represent the pitch angle between the first signal group and the disturbance source and the pitch angle between the second signal group and the disturbance source, and the spatial energy distribution functions of the disturbance source are calculated according to the following equation, $$D(\theta_1^1,\varphi_1^1)=A^1(\theta_1^1,\varphi_1^1)^H R_1 A^1(\theta_1^1,\varphi_1^1)$$

$$D(\theta_1^2,\varphi_1^2)=A^1(\theta_1^2,\varphi_1^2)^H R_2 A^1(\theta_1^2,\varphi_1^2)$$

wherein, H represents the conjugate transpose, the azimuth vector $(\theta_1^1, \varphi_1^1)$ of the disturbance source relative to the first signal group and the azimuth vector $(\theta_1^2, \varphi_1^2)$ of the disturbance source relative to the second signal group can be calculated respectively by searching for maximum values of the spatial energy distribution functions $D(\theta, \varphi)$;

finally, obtaining the three-dimensional space coordinates of the disturbance source by calculating the direction vectors corresponding to the first signal group and the second signal group according to the following equation, $$\left( x_1 = y_1 \tan \theta_1^1, \; y_1 = \frac{L^1}{|\tan \theta_1^1 - \tan \theta_1^2|}, \; z_1 = \frac{y}{\cos \theta_1^1 \tan \varphi_1^1} \right)$$

wherein $L^1$ represents a spatial distance corresponding to the first signal group and the second signal group.

Figure 3:
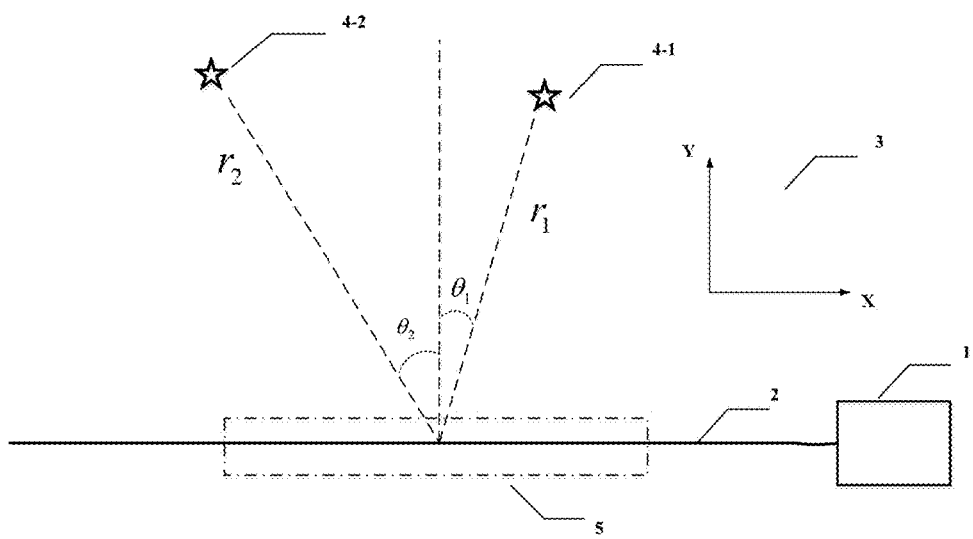
FIG. 3 is a schematic structural diagram of a two-dimensional positioning spatial system for multiple disturbance sources.

Embodiment 2: A Two-Dimensional Spatial Positioning for Multiple Disturbance Sources The embodiment 2 proposes a two-dimensional spatial positioning system for multiple disturbance sources, wherein the sensing optical fiber is laid in a Chinese word "-"-shape, and the schematic diagram of its principle is shown in FIG. 3. The system comprises a distributed optical fiber acoustic sensing system 1 comprising the phase-sensitive optical time domain reflectometer, a sensing optical fiber 2 of the Chinese word "-"-shaped structure laying mode, a coordinate system 3, disturbance sources to be monitored 4-1, 4-2, and a signal group 5. The distributed optical fiber acoustic sensing system 1 comprising the phase-sensitive optical time domain reflectometer is connected with the sensing optical fiber 2, and the disturbance sources to be monitored and the sensing optical fiber are in the same plane. The distributed optical fiber acoustic sensing system 1 based on the phase-sensitive optical time domain reflectometer can be coherent detection or direct detection.

Figure 4:
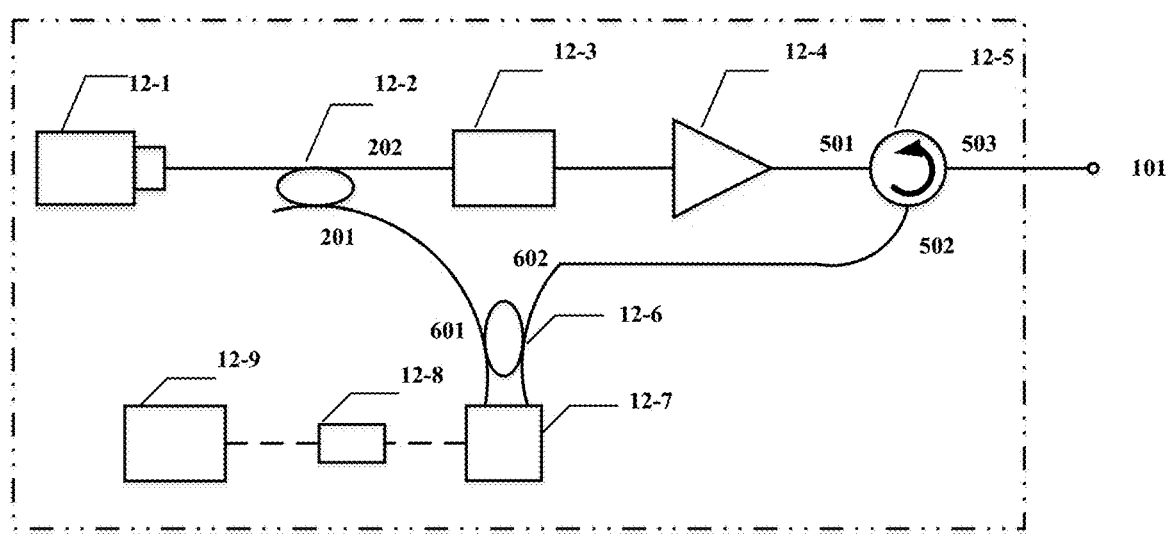
FIG. 4 is a schematic structural diagram of a distributed optical fiber acoustic sensing system based on a phase-sensitive optical time domain reflectometer with coherent detection.

As shown in FIG. 4, the distributed optical fiber acoustic sensing system 1 based on the phase-sensitive optical time domain reflectometer with coherent detection comprises a laser 12-1, a first optical fiber coupler 12-2, a second optical fiber coupler 12-6, a pulse modulator 12-3, an optical amplifier 12-4, an optical fiber circulator 12-5, a double-balanced photoelectric detector 12-7, an electrical amplifier 12-8, and a data processing unit 12-9.

A laser output of the laser 12-1 is coupled to the first fiber coupler 12-2, and a first port 201 and a second port 202 of the first fiber coupler 12-2 are respectively coupled to a first port 601 of the second fiber coupler 12-6 and the pulse modulator 12-3. An output of the pulse modulator 12-3 is coupled to the optical amplifier 12-4. An output of the optical amplifier 12-4 is coupled to a first port 501 of the fiber circulator 12-5 and then is output via a third port 503 and connected to an optical port 101. A second port 502 of the optical fiber circulator 12-5 is coupled to a second port 602 of the second optical fiber coupler 12-6. An output of the second optical fiber coupler 12-6 is coupled to the double-balanced photoelectric detector 12-7. An output signal of the double-balanced detector 12-7 is coupled to the electrical amplifier 12-8 for amplification, and then is input into the data processing unit 12-8 for processing.

Figure 5:
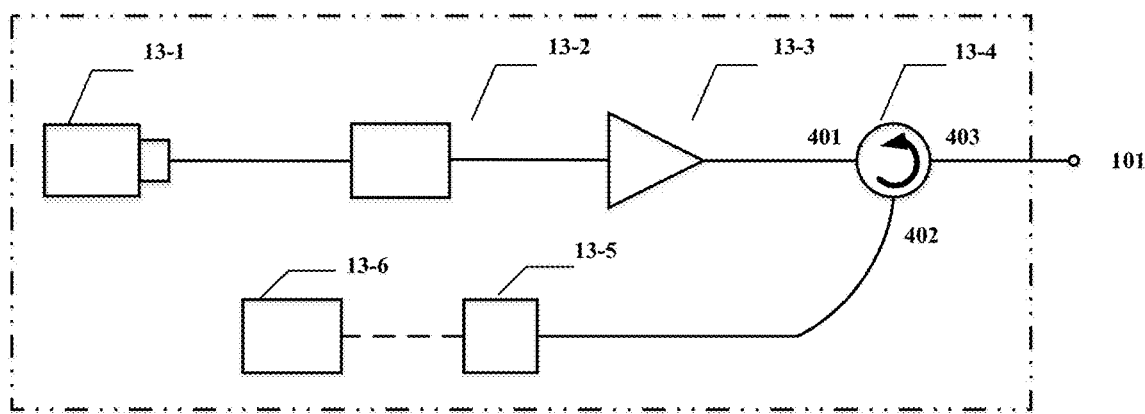
FIG. 5 is a schematic structural diagram of a distributed optical fiber acoustic sensing system based on a phase-sensitive optical time domain reflectometer with direct detection.

As shown in FIG. 5, the distributed optical fiber acoustic sensing system 1 based on the phase-sensitive optical time domain reflectometer with direct detection comprises a laser 13-1, a pulse modulator 13-2, an optical amplifier 13-3, an optical fiber circulator 13-4, a photoelectric detector 13-5 and a data processing unit 13-6.

A laser output of the laser 13-1 is coupled to the pulse modulator 13-2. An output of the pulse modulator 13-2 is coupled to an optical amplifier 13-3. An output of the optical amplifier 13-3 is coupled to a first port 401 of the optical fiber circulator 13-4 and then is output via a third port 403 and connected to an optical port 101. A second port 402 of the optical fiber circulator 13-4 is coupled to a photoelectric detector 13-5, and an output signal of the photoelectric detector (13-5) is coupled to the data processing unit 13-6.

Figure 6:
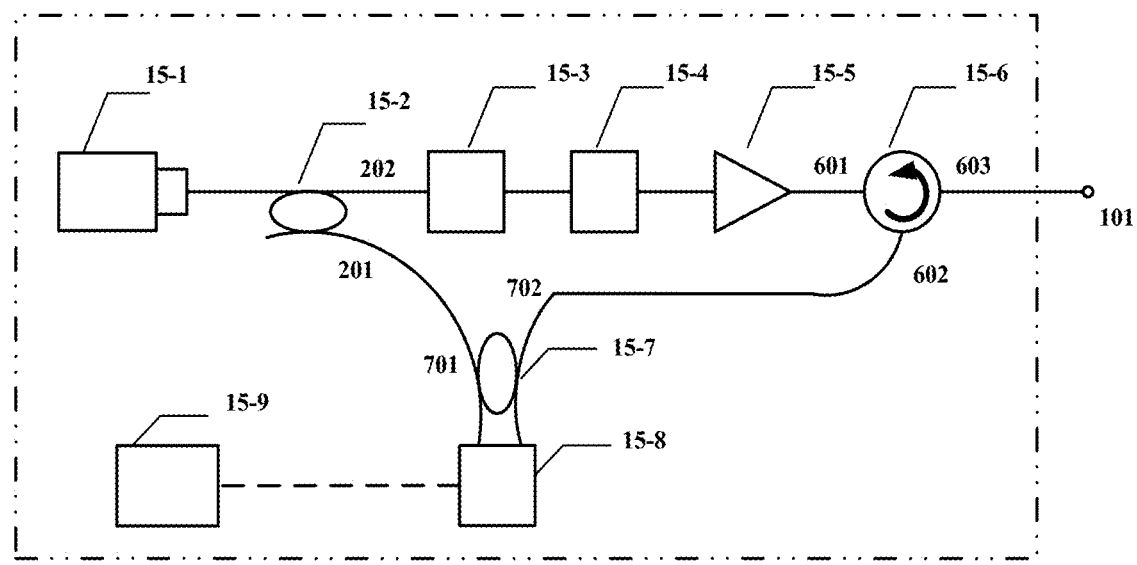
FIG. 6 is a schematic structural diagram of a distributed optical fiber acoustic sensing system based on a high spatial resolution coherent detection phase-sensitive optical time domain reflectometer.

The distributed optical fiber acoustic sensing system 1 using a phase-sensitive optical time domain reflectometer with a high spatial resolution coherent detection is shown in FIG. 6. The system 1 comprises a laser 15-1, a first optical fiber coupler 15-2, a second optical fiber coupler 15-7, a pulse modulator 15-4, an optical amplifier 15-5, an optical fiber circulator 15-6, a double-balanced photoelectric detector 15-8 and a data processing unit 15-9.

A laser output of the laser 15-1 is coupled to the first fiber coupler 15-2. A first port 201 and a second port 202 of the first fiber coupler 15-2 are respectively coupled to the first port 701 of the second fiber coupler 15-7 and the frequency tuner 15-3. An output of the frequency tuner 15-3 is coupled to the pulse modulator 15-4. An output of the pulse modulator 15-4 is coupled to the optical amplifier 15-5. An output of the optical amplifier 15-5 is coupled to a first port 601 of the fiber circulator 15-6, and then is output through a third port 603 and connected to an optical port 101. A second port 602 of the fiber circulator 15-6 is coupled to a second port 702 of the second fiber coupler 15-7. An output of the second fiber coupler 15-7 is coupled to the double-balanced photoelectric detector 15-8, and an output signal of the double-balanced detector 15-8 is input to the data processing unit 15-9 for processing.

The two-dimensional positioning method for the multiple disturbance sources mainly comprises three steps:

step 1) transmitting detection light pulses to the sensing optical fiber 2 via the distributed optical fiber acoustic sensing system 1 containing the phase-sensitive optical time domain reflectometer, quantitatively detecting the sound field sensed along the sensing optical fiber, and obtaining sound field signals S(l, t) distributing along the optical fiber.

step 2) pre-processing the obtained sound field signals by the phase-sensitive optical time domain reflectometer 1:

firstly, performing a coordinate system transformation of the sound field signals S(l, t) according to the laying mode T[x, y, z] of the sensing fiber, thereby obtaining a distribution $S_d(x, y, z, t) = T[S(l, t)]$ of the sound field distribution signals within the space formed by the optical fiber. The data processing unit is required to set the sound field intensity threshold E according to the disturbance sources to be monitored in advance, and search for the area to be monitored $\Omega(x, y, z)$ where the sound field intensity is greater than the threshold E within the sound field signal distribution $S_d(l, t)$.

secondly, the distributed optical fiber acoustic sensor is required to determine the center frequency $f_0$ of the disturbance sources to be monitored in advance, and the data processing unit selects a sound field time-domain signal matrix composed of n adjacent sound field sampling signals with a space as close as possible to $d = v/2f_0$ within the area to be monitored $\Omega(x, y, z)$ as a signal group, wherein there are 2 disturbance sources, which should satisfy the relation that n is greater than 2, $$X(x,y,z,t) = [S_d(x_1,y_1,z_1,t) S_d(x_2,y_2,z_2,t) \ldots S_d(x_n,y_n,z_n,t)]^T$$

step 3) processing the signal group according to a spatial spectrum estimation algorithm, and calculating the covariance matrix of the signal group according to the following equation, $$R = \sum_{i=1}^{N} X(x, y, z, t_i) X(x, y, z, t_i)^T / N$$

wherein N represents the repetition number of the detection optical pulses transmitted by the phase-sensitive time domain reflectometer to the sensing optical fiber through the optical port, secondly, performing eigenvalue decomposition on the covariance matrix R to obtain noise subspace $E_n$, calculating signal subspace $E_s(\theta_i, r_i)$ corresponding to the signal group according to the laying mode T[x, y, z] of the sensing fiber, wherein $\theta_i$ represents the azimuth angle of the i-th disturbance source, $r_i$ represents the linear distance from the i-th disturbance source to the center position of the signal group, and calculating the loss function according to the following equation, $$\Gamma(\theta_i, r_i) = \frac{1}{(E_s(\theta_i, r_i)E_n)^H} E_n E_s(\theta_i, r_i)$$

wherein, H represents the conjugate transpose, and the azimuth vector $(\theta_i, r_i)$ of the disturbance source relative to the first signal group can be calculated by searching for the maximum value of the loss function;

finally, calculating the two-dimensional space coordinates of the i-th disturbance source according to the following equation, $(x_i = r_i \sin \theta_i, y_i = r_i \cos \theta_i)$

Embodiment 3: Other Types of the Distributed Acoustic Sensor Systems

Figure 7:
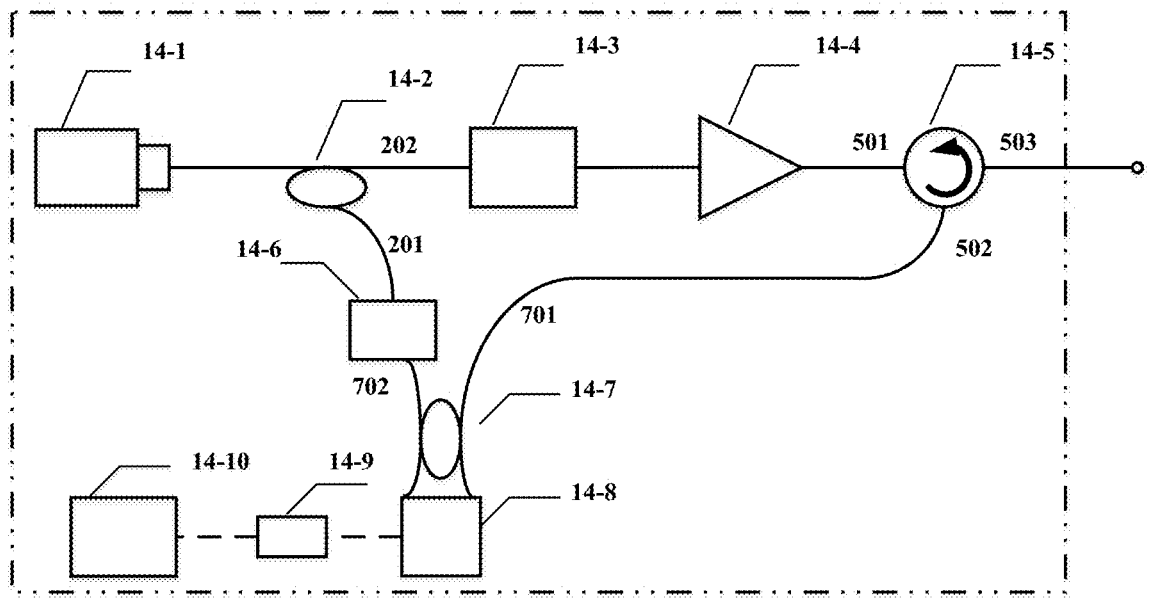
FIG. 7 is a schematic structural diagram of a distributed optical fiber acoustic sensing system based on a Brillouin optical time domain reflectometer with a heterodyne detection structure.

The distributed optical fiber acoustic sensing system 1 based on Brillouin optical time domain reflectometer with a heterodyne detection structure is shown in FIG. 7. The system 1 comprises a laser 14-1, a first optical fiber coupler 14-2, a second optical fiber coupler 14-7, a pulse modulator 14-3, an optical amplifier 14-4, an optical fiber circulator 14-5, a broadband frequency shift unit 14-6, a double-balanced photoelectric detector 14-8, an electrical amplifier 14-9, and a data processing unit 14-10.

A laser output of the laser 14-1 is coupled to the first fiber coupler 14-2. A first port 201 and a second port 202 of the first fiber coupler 14-2 are respectively coupled to the broadband frequency shift unit 14-6 and the pulse modulator 14-3. An output of the pulse modulator 14-3 is coupled to the optical amplifier 14-4. An output of the optical amplifier 14-4 is coupled to a first port 501 of the fiber circulator 14-5 and then is output through a third port 503 and coupled to an optical port 101. A second port 502 of the fiber circulator 14-5 is coupled to a first port 701 of the second fiber coupler 14-7. An output of the wideband frequency shift unit 14-6 is coupled to a second port 702 of the second fiber coupler 14-7. An output of the second optical fiber coupler 14-7 is coupled to the double-balanced photoelectric detector 14-8, and an output signal of the double-balanced detector 14-8 is coupled to the electrical amplifier 14-9 for amplification, and then is input into the data processing unit 14-10 for processing.

Embodiment 4: Two-Dimensional Space Laying Mode of the Sensing Optical Fiber As shown in FIG. 8, after the sensing optical fiber is subjected to bend once within the allowable loss range, a double parallel optical fiber laying structure is formed.

Figure 9:
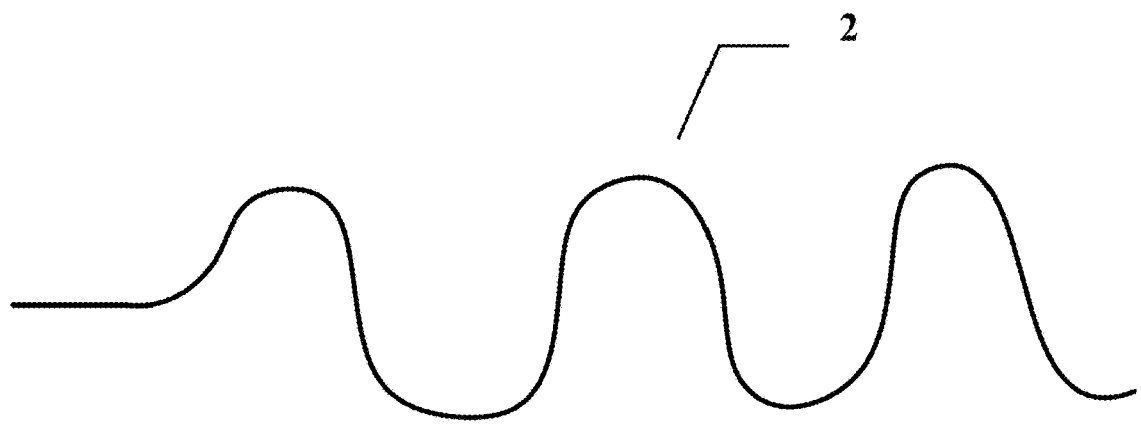
FIG. 9 is an S-like optical fiber laying structure.

As shown in FIG. 9, after the sensing optical fiber is subjected to bend multiple times within the allowable loss range, an S-like optical fiber laying structure is formed, in which the bending radius and bending times of each part are specially set according to the application scenarios.

Figure 10:
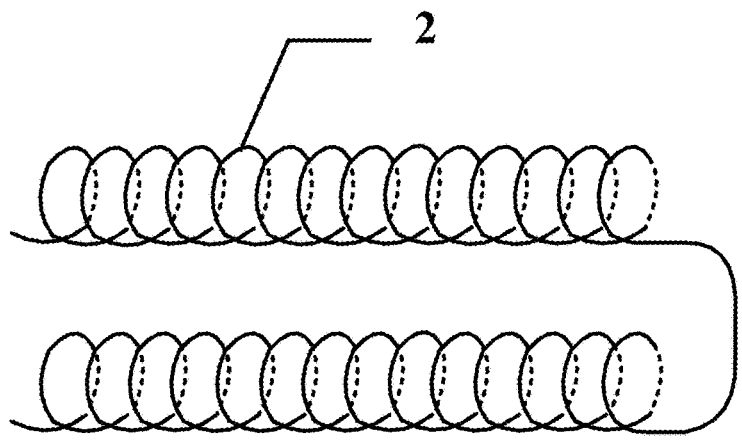
FIG. 10 is a special-shaped dual-parallel optical fiber laying structure without a sensitizing mandrel.

As shown in FIG. 10, after the sensing optical fiber undergoes once spiral winding within the allowable loss range into a cylinder and the cylinder is bent once, a sensing optical fiber with a dual-parallel optical fiber laying structure is formed.

Figure 11:
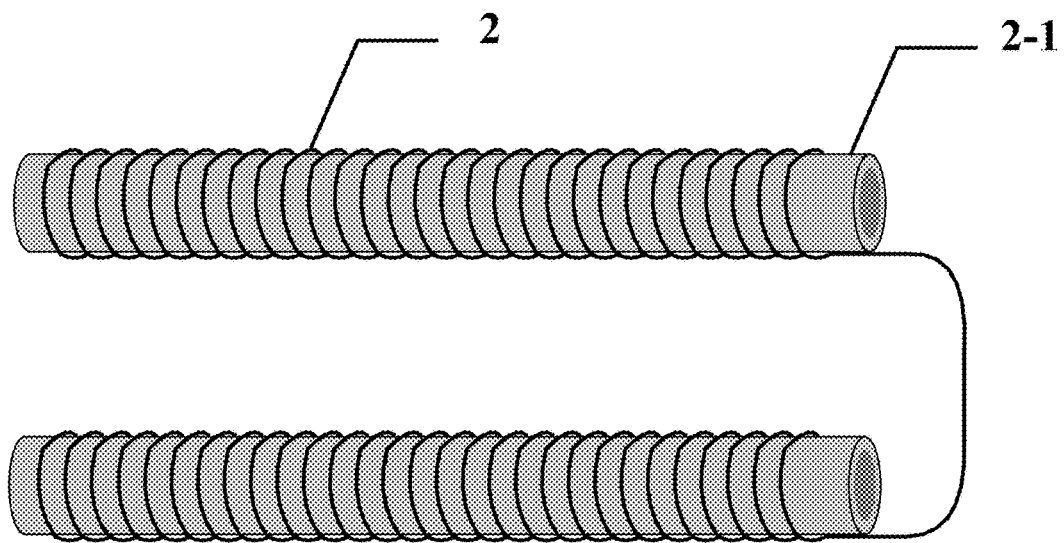
FIG. 11 is a special-shaped dual-parallel optical fiber laying structure with a sensitizing mandrel.

As shown in FIG. 11, after the sensing optical fiber undergoes once spiral winding around the sensitizing mandrel 2-1 within the allowable loss range to form a cylinder, and the cylinder is bent, a dual-parallel optical fiber laying structure is formed.

Embodiment 5: Three-Dimensional Space Laying Mode of the Sensing Optical Fiber

Figure 12:
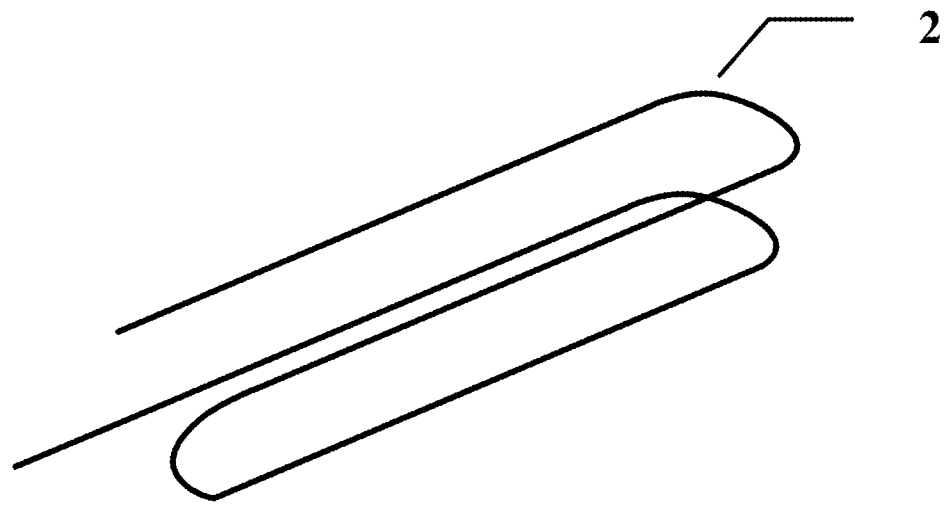
FIG. 12 is a double-layer dual-parallel optical fiber laying structure.

As shown in FIG. 12, after the sensing optical fiber is subjected to bend three times within the allowable loss range, a double-layer dual-parallel optical fiber laying structure, similar to a cuboid is formed, and the transverse spacing and longitudinal spacing of the cuboid optical fiber are specially set according to the application scenario.

Figure 13:
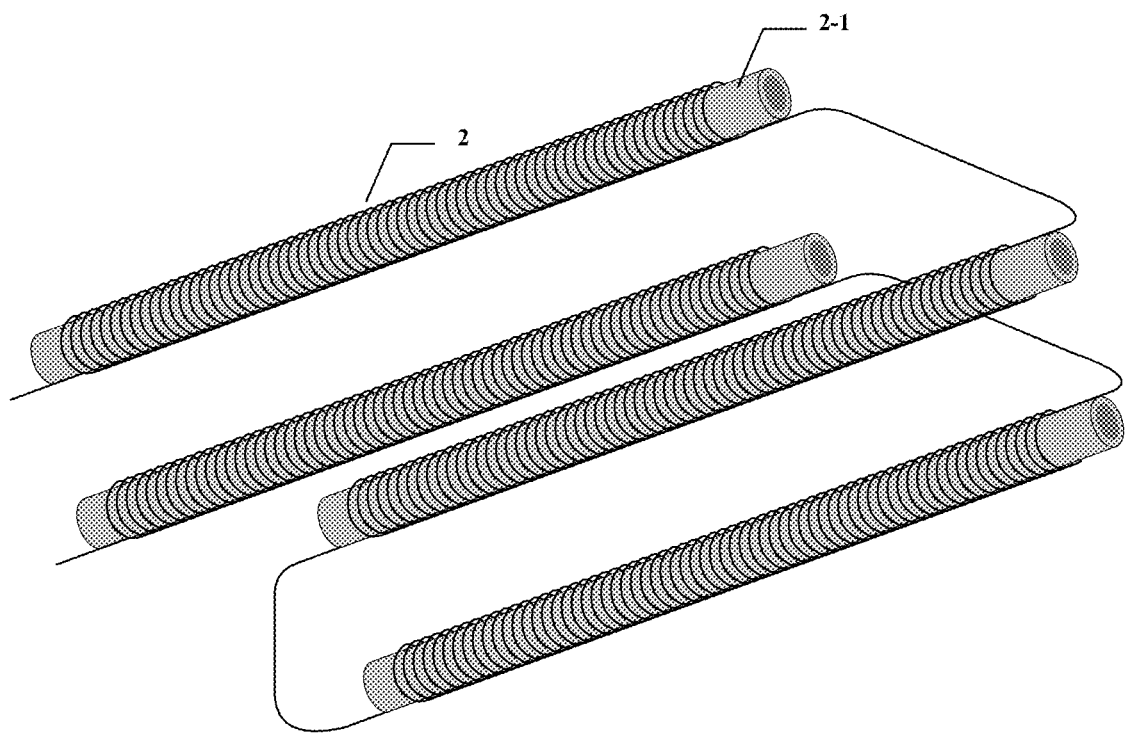
FIG. 13 is a special-shaped double-layer dual-parallel optical fiber laying structure with a sensitizing mandrel.

As shown in FIG. 13, after the sensing optical fiber undergoes once spiral winding around the sensitizing mandrel 2-1 within the allowable loss range to become a cylinder and the cylinder is bent, a double-layer dual-parallel optical fiber laying structure, similar to a cuboid is formed, the transverse spacing and longitudinal spacing of the cuboid optical fiber are specially set according to the application scenario.

What is claimed is:

1. A multi-dimensional spatial positioning system for disturbance source, wherein the multi-dimensional spatial positioning system at least comprises a distributed optical fiber acoustic sensor, a sensing optical fiber, a disturbance source to be monitored and a coordinate system, wherein the distributed optical fiber acoustic sensor is coupled to the sensing optical fiber, the distributed optical fiber acoustic sensor emits detection light pulses to the sensing optical fiber, so that sound field distribution signals are obtained, the sound field distribution signals and a laying mode of the sensing optical fiber are processed, a key parameter of the disturbance source to be monitored relative to the sensing optical fiber is obtained, and spatial position coordinates of the disturbance source are calculated;

wherein the key parameter at least comprises one or more of a azimuth angle, a pitch angle, a transverse distance, a radial distance, a sound speed and a frequency;

the laying mode of the sensing optical fiber comprises one or more of a two-dimensional space laying mode and a three-dimensional space laying mode;

wherein the positioning system obtains the sound field distribution signals and processes the sound field distribution signals according to the following steps:

step 1): setting up one coordinate system (x, y, z) in a three-dimensional space, laying a sensing optical fiber in a laying mode recorded as T[x, y, z], the distributed optical fiber acoustic sensor emitting detection light pulses to the sensing optical fiber via the distributed optical fiber acoustic sensor, and quantitatively detecting a sound field along the sensing optical fiber to obtain sound field signals S(l, t) distributing along the optical fiber, wherein t represents time, l represents one-dimensional axial spatial coordinates of the sensing fiber;

Step 2): pre-processing the obtained sound field signals S(l, t) distributing along the optical fiber:

firstly, performing a coordinate system transformation of the sound field signals S(l, t) distributing along the optical fiber, thereby obtaining a distribution $S_d(x, y, z, t)=T[S(z, t)]$ of the sound field distribution signals within a space formed by the sensing optical fiber, secondly, determining a center frequency $f_0$ of the disturbance source to be monitored, setting an sound field intensity threshold E by a data processing unit according to each disturbance source to be monitored, and searching for an area to be detected $\Omega(x, y, z)$ where the sound field intensity is greater than the threshold E in a sound field distribution signals $S_d(l, t)$, and selecting a sound field time-domain signal matrix formed by n adjacent sound field sampling signals as a first signal group within the area to be detected $\Omega(x, y, z)$, wherein a direct distance between the sound field sampling signals is as close as possible to $$d = \frac{v}{2f_0}$$

(wherein v is a propagation rate of sound waves in a medium), the first signal group is expressed as follows:

$$X_1(x,y,z,t)=[S_d(x_1,y_1,z_1,t)S_d(x_2,y_2,z_2,t) \ldots S_d(x_n,y_n,z_n,t)]^T$$

wherein a sum of transverse dimensions of spaces occupied by the adjacent n sound field sampling signals of the first signal group is L, and the n is greater than m being a number of disturbance source(s) greater than or equal to 1, that is, when there are multiple disturbance sources, it is necessary to ensure that the sound field sampling signals of each signal group outnumber the disturbance sources, so as to avoid signal interference between different disturbance sources and improve monitoring accuracy;

step 3): applying an array signal processing method to the signal group in the step 2) to calculate the spatial position coordinates of the disturbance source to be monitored.

2. The multi-dimensional spatial positioning system for disturbance source according to claim 1, wherein the distributed optical fiber acoustic sensor comprises one or more of a phase-sensitive optical time domain reflectometer with coherent detection, a phase-sensitive optical time domain reflectometer with direct detection, an optical frequency domain reflectometer, and a distributed optical fiber sensor based on Brillouin scattering principle.

3. The multi-dimensional spatial positioning system for disturbance source according to claim 2, wherein the optical frequency domain reflectometer is structured to adopt a Michelson interferometer structure, and comprises a frequency tunable laser (11-1), an optical fiber coupler (11-2), an optical fiber reflection end face (11-3), a photoelectric detector (11-4) and a data processing unit (11-5);

the frequency tunable laser (11-1) outputs a linear frequency modulating laser which is respectively output to a second port (202) and a fourth port (204) of the optical fiber coupler 11-2 through a first port 201 of the optical fiber coupler (11-2); the second port (202) of the optical fiber coupler (11-2) is coupled to the optical fiber reflection end face (11-3); the fourth port (204) of the optical fiber coupler (11-2) is coupled to an optical port (101); a third port (203) of the optical fiber coupler (11-2) is coupled to the photoelectric detector (11-4), and an output signal of the photoelectric detector is coupled to the data processing unit (11-5).

4. The multi-dimensional spatial positioning system for disturbance source according to claim 2, wherein the phase-sensitive optical time domain reflectometer with coherent detection comprises a laser (12-1), a first optical fiber coupler (12-2), a second optical fiber coupler (12-6), a pulse modulator (12-3), an optical amplifier (12-4), an optical fiber circulator (12-5), a double-balanced photoelectric detector (12-7), an electrical amplifier (12-8) and a data processing unit (12-9);

a laser output of the laser (12-1) is respectively coupled to the pulse modulator (12-3) and a first port (601) of the second fiber coupler (12-6) through the first fiber coupler (12-2); an output of the pulse modulator (12-3) is coupled to the optical amplifier (12-4); an output of the optical amplifier (12-4) is coupled to a first port (501) of the fiber circulator (12-5) and then is output through a third port (503) and coupled to an optical port (101); an second port (502) of the optical fiber circulator (12-5) is coupled to an second port (602) of the second optical fiber coupler (12-6); an output of the second optical fiber coupler (12-6) is coupled to the double-balanced photoelectric detector (12-7); an output signal of the double-balanced detector (12-7) is coupled to the electrical amplifier (12-8) for amplification, and then is input to the data processing unit (12-8) for processing.

5. The multi-dimensional spatial positioning system for disturbance source according to claim 2, wherein the phase-sensitive optical time domain reflectometer with direct detection comprises a laser (13-1), a pulse modulator (13-2), an optical amplifier (13-3), an optical fiber circulator (13-4), a photoelectric detector (13-5) and a data processing unit (13-6);

a laser output of the laser (13-1) is coupled to the pulse modulator (13-2); an output of the pulse modulator (13-2) is coupled to the optical amplifier (13-3); an output of the optical amplifier (13-3) is coupled to a first port (401) of the optical fiber circulator (13-4) and is output through a third port (403) and coupled to an optical port (101); an second port (402) of the optical fiber circulator (13-4) is coupled to the photoelectric detector (13-5), and an output signal of the photoelectric detector (13-5) is coupled to the data processing unit (13-6).

6. The multi-dimensional spatial positioning system for disturbance source according to claim 2, wherein the distributed optical fiber sensor based on Brillouin scattering principle adopts a heterodyne detection structure, comprising a laser (14-1), a first optical fiber coupler (14-2), a second optical fiber coupler (14-7), a pulse modulator (14-3), an optical amplifier (14-4), an optical fiber circulator (14-5), a broadband frequency shift unit (14-6), a double-balanced photoelectric detector (14-8), an electrical amplification (14-9) and a data processing unit (14-10);

a laser output of the laser (14-1) is respectively coupled to the pulse modulator (14-3) and the broadband frequency shift unit (14-6) through the first fiber coupler (14-2); an output of the pulse modulator (14-3) is coupled to the optical amplifier (14-4); an output of the optical amplifier (14-4) is coupled to a first port (501) of the fiber circulator (14-5) and then is output through a third port (503) and coupled to an optical port (101); a second port (502) of the fiber circulator (14-5) is coupled to a first port (701) of the second fiber coupler; an output of the wideband frequency shift unit (14-6) is coupled to a second port (702) of the second fiber coupler (14-7); an output of the second optical fiber coupler (14-7) is coupled to the double-balanced photoelectric detector (14-8), and an output signal of the double-balanced detector (14-8) is coupled to the electrical amplifier (14-9) for amplification, and then is input to the data processing unit (14-10) for processing.

7. The multi-dimensional spatial positioning system for disturbance source according to claim 1, wherein the two-dimensional spatial laying mode comprises one of a dual-parallel optical fiber laying structure and an S-like bent optical fiber laying structure.

8. The multi-dimensional spatial positioning system for disturbance source according to claim 7, wherein the dual-parallel optical fiber laying structure is a special-shaped sensitization dual-parallel optical fiber laying structure with mandrel or a special-shaped sensitization dual-parallel optical fiber layering structure without mandrel.

9. The multi-dimensional spatial positioning system for disturbance source according to claim 1, wherein the three-dimensional space laying mode is a double-layer dual-parallel optical fiber laying structure.

10. The multi-dimensional spatial positioning system for disturbance source according to claim 1, wherein the disturbance source at least comprises an object that generates sound waves, seismic waves and water waves through vibration.

11. A multi-dimensional spatial positioning method for disturbance source, wherein there are m disturbance source (s) to be monitored, and m is greater than or equal to 1, wherein the method comprises the following three steps:

step 1) setting up a coordinate system (x, y, z) in a three-dimensional space, laying a sensing optical fiber in a laying mode recorded as T[x, y, z], emitting detection light pulses to the sensing optical fiber via a distributed optical fiber acoustic sensor, and quantitatively detecting a sound field along the sensing optical fiber to obtain sound field signals S(l, t) distributing along the optical fiber, wherein t represents time, l represents one-dimensional axial spatial coordinates of the sensing fiber;

step 2) pre-processing the obtained sound field signals S(l, t) distributing along the optical fiber:

firstly, performing a coordinate system transformation of the sound field signals S(l, t) distributing along the optical fiber, thereby obtaining a distribution $S_d(x, y, z, t) = T[S(z, t)]$ of the sound field distribution signals within a space formed by the sensing optical fiber, secondly, determining a center frequency $f_0$ of the disturbance source to be monitored, setting a sound field intensity threshold E by a data processing unit according to each disturbance source to be monitored, and searching for an area to be detected $\Omega(x, y, z)$ where the sound field intensity is greater than the threshold E in a sound field distribution signals $S_d(l, t)$, and selecting a sound field time-domain signal matrix formed by n adjacent sound field sampling signals as a first signal group within the area to be detected $\Omega(x, y, z)$, wherein a direct distance between the sound field sampling signals is as close as possible to $$d = \frac{v}{2f_0}$$

(wherein v is a propagation rate of sound waves in a medium), wherein the first signal group is expressed as follows:

$$X_1(x,y,z,t) = [S_d(x_1,y_1,z_1,t) S_d(x_2,y_2,z_2,t) \ldots S_d(x_n,y_n,z_n,t)]^T$$

wherein a sum of transverse dimensions of spaces occupied by the adjacent n sound field sampling signals of the first signal group is L, wherein n is greater than m;

step 3) applying an array signal processing method to the signal group in the step 2) to calculate the spatial position coordinates of the disturbance source to be monitored.

12. The multi-dimensional spatial positioning method for disturbance source according to claim 11, wherein a selection of the signal group in step 2) further comprises selecting a second signal group, and comprises the following steps:

selecting signals in an area with a spatial distance ($L^1$) greater than L from the first signal group as the second signal group within the area to be detected $\Omega(x, y, z)$, wherein the second signal group contains n sound field sampling signals between which a spacing is as close as possible to $$d = \frac{v}{2f_0},$$

wherein the second signal group is expressed as follows:

$$X_2(x,y,z,t)=[S_d(x_1^2,y_1^2,z_1^2,t)S_d(x_2^2,y_2^2,z_2^2,t) \ldots S_d(x_n^2,y_n^2,z_n^2,t)]^T;$$

selecting an e-th signal group: selecting signals in an area with spatial distances ($L^1, L^2, \ldots L^{e-1}$) greater than L from the first to an (e-1)-th signal group as the e-th signal group within the area to be detected $\Omega(x, y, z)$, wherein the e-th signal group contains n sound field sampling signals between which a spacing is as close as possible to $$d = \frac{v}{2f_0},$$

wherein use e-un signal group is expressed as follows:

$$X_e(x,y,z,t)=[S_d(x_1^e,y_1^e,z_1^e,t)S_d(x_2^e,y_2^e,z_2^e,t) \ldots S_d(x_n^e,y_n^e,z_n^e,t)]^T.$$

13. The multi-dimensional spatial positioning method for disturbance source according to claim 12, wherein when e is 2, the array signal processing method in step 3) adopts a beam forming algorithm which has the following steps:

firstly, respectively calculating covariance matrices of the first signal group and the second signal group according to the following equations, $$R_1 = \frac{\sum_{i=1}^N X_1(x, y, z, t_i)X_1(x, y, z, t_i)^T}{N}$$

$$R_2 = \frac{\sum_{i=1}^N X_2(x, y, z, t_i)X_2(x, y, z, t_i)^T}{N}$$

wherein N represents repetition number of the detection light pulses emitted from the distributed optical fiber acoustic sensor to the sensing optical fiber;

secondly, respectively calculating phase delay vector $A^1(\theta_i^1, \varphi_i^1)$ corresponding to the first signal group and phase delay vector $A^2(\theta_i^2, \varphi_i^2)$ corresponding to the second signal group according to a sensing fiber laying method T[x, y, z], wherein $\theta_i^1$ represents an azimuth angle between an i-th disturbance source and the first signal group, $\theta_i^2$ represents an azimuth angle between the i-th disturbance source and the second signal group, $\varphi_i^1$ represents a pitch angle between the first signal group and the i-th signal group, $\varphi_i^2$ represents a pitch angle between the second signal group and the i-th signal group, and a spatial energy distribution functions $D(\theta, \varphi)$ of the disturbance source is calculated according to the following equation, $$D(\theta_1^1,\varphi_1^1)=A^1(\theta_1^1,\varphi_1^1)^H R_1 A^1(\theta_1^1,\varphi_1^1)$$

$$D(\theta_1^2,\varphi_1^2)=A^1(\theta_1^2,\varphi_1^2)^H R_2 A^1(\theta_1^2,\varphi_1^2)$$

wherein, H represents a conjugate transpose, an azimuth vector $(\theta_1^1, \varphi_1^1)$ of the i-th disturbance source relative to the first signal group and an azimuth vector $(\theta_i^2, \varphi_i^2)$, of the i-th disturbance source relative to the second signal group is calculated by searching maximum values on the spatial energy distribution functions $D(\theta, \varphi)$, finally, three-dimensional space coordinates of the i-th disturbance source are obtained by calculating the direction vectors corresponding to the first signal group and the second signal group according to the following equation, $$\left(x_i = y_i\tan\theta_i^1, \, y_i = \frac{L^1}{|\tan\theta_i^1 - \tan\theta_i^2|}, \, z_i = \frac{y}{\cos\theta_i^1\tan\varphi_i^1}\right)$$

wherein $L^1$ is the spatial distance corresponding to the first signal group and the second signal group.

14. The multi-dimensional spatial positioning method for disturbance source according to claim 11, wherein the array signal processing method in step 3) comprises one of a beam forming algorithm, a spatial spectrum estimation algorithm, and a direction-of-arrival estimation algorithm.

15. The multi-dimensional spatial positioning method for disturbance source according to claim 14, wherein the spatial spectrum estimation algorithm in step 3) is as follows:

firstly, calculating a covariance matrix of the first signal group, $$R = \frac{\sum_{i=1}^N X_1(x, y, z, t_i)X_1(x, y, z, t_i)^T}{N}$$

wherein N represents repetition number of the detection light pulses emitted from the distributed optical fiber acoustic sensor to the sensing optical fiber through an optical port;

secondly, performing eigenvalue decomposition on the covariance matrix R to obtain noise subspaces $E_n$, calculating signal subspaces $E_s(\theta_i, r_i)$ corresponding to the signal groups according to the laying mode T[x, y, z] of the sensing fiber, wherein $\theta_i$ represents an azimuth angle of the i-th disturbance source, $r_i$ represents a linear distance from the i-th disturbance source to a center position of the signal groups, and a loss function is calculated according to the following equation, $$\Gamma(\theta, r) = \frac{1}{[E_s(\theta, r)E_n]^H} E_n E_s(\theta, r)$$

wherein, H represents a conjugate transpose, and an azimuth vector $(\theta_i, r_i)$ of the disturbance source relative to the first signal group is calculated by searching for the maximum value of the loss function;

finally, the two-dimensional space coordinates of the i-th disturbance source are calculated according to the following equation, $(x_i = r_i \sin \theta_i, y_i = r_i \cos \theta_i)$.

* * * * *